United States Patent [19]

Nomura

[11] Patent Number: 5,559,564
[45] Date of Patent: Sep. 24, 1996

[54] CATHODE RAY TUBE APPARATUS FOR PROJECTION TV SYSTEM

[75] Inventor: Tsuneharu Nomura, Kanagawa, Japan

[73] Assignee: Sony Corporation, Tokyo, Japan

[21] Appl. No.: 271,670

[22] Filed: Jul. 7, 1994

[30] Foreign Application Priority Data

Jul. 15, 1993 [JP] Japan .................. 5-175680

[51] Int. Cl.$^6$ .................. H04N 5/72; H04N 9/31
[52] U.S. Cl. .................. 348/779; 348/786; 348/778; 313/469
[58] Field of Search .................. 348/786, 781, 348/776, 779, 778, 835, 834, 832, 745, 744, 787, 815, 816; 313/467–469, 480; H04N 5/72, 9/31, 9/16, 5/66

[56] References Cited

U.S. PATENT DOCUMENTS

| | | | |
|---|---|---|---|
| 2,553,182 | 5/1957 | Cage | 348/786 |
| 4,390,637 | 6/1983 | Daiku | 313/480 |
| 4,454,446 | 6/1984 | Kobayashi | 348/776 |
| 4,454,535 | 6/1984 | Machida | 348/786 |
| 4,729,031 | 3/1988 | Saito et al. | 348/779 |
| 4,807,014 | 2/1989 | Van Gorkum et al. | 348/779 |
| 4,937,661 | 6/1990 | Van der Voort | 348/779 |
| 5,010,396 | 4/1991 | Hanyu et al. | 348/779 |
| 5,031,033 | 7/1991 | Tsukagoshi et al. | 348/776 |
| 5,053,922 | 10/1991 | Wessling | 348/786 |
| 5,057,912 | 10/1991 | De Leeuw et al. | 348/786 |
| 5,115,306 | 5/1992 | Tsuda et al. | 348/776 |
| 5,200,667 | 4/1993 | Iwasaki et al. | 313/478 |
| 5,296,922 | 3/1994 | Mitani et al. | 348/779 |

FOREIGN PATENT DOCUMENTS 361903 3/1991 Japan .................. H04N 9/31

OTHER PUBLICATIONS

Patent Abstract of 03–61903, Projector for Projection Television, Mar. 18, 1991.

*Primary Examiner*—Safet Metjahic
*Attorney, Agent, or Firm*—Ronald P. Kananen

[57] ABSTRACT

A cathode ray tube apparatus for a projection TV system which improves the color purity of the luminescence in the cathode ray tube, reduces the chromatic aberration by the projection lens, enables the same type of projection lens to be mounted for all of the green, red and blue CRT apparatuses, and enables manufacturing costs to be slashed by such a common use of components. A light-absorbing agent is incorporated into the panel glass so that the transmittance having the light of wavelengths other than the main wavelength of the spectrum of luminescence of the phosphor of the CRT apparatus, is reduced below the transmittance of the light of the main wavelength. By incorporating this agent into the panel glass of a green CRT apparatus the average value of the transmittance of the light of the wavelength in the range of 500 nm to 560 nm becomes higher than the transmittance of the light of the wavelengths outside this range. Alternatively, by incorporating the agent into the panel glass of a red CRT apparatus the average value of the transmittance of the light of the wavelength in the range of 600 nm to 700 nm is increased as compared with the transmittance of the light of the wavelength in the range of 500 nm to 600 nm.

11 Claims, 4 Drawing Sheets

CATHODE RAY TUBE APPARATUS FOR PROJECTION TV SYSTEM

BACKGROUND OF THE INVENTION

1. Field of the Invention

The present invention relates to a cathode ray tube (CRT) apparatus used for a projection TV system (projector), more particularly to a CRT apparatus for a projection TV system which improves the purity of color of the light emitted therefrom.

2. Description of the Related Art

Television systems which have larger display screens and which are able to display larger images as compared with ordinary TV systems, include front type and rear projection type TV systems. In such projection TV systems, separate images are emitted from red (R), green (G), and blue (B) projection CRTs and are focused on a display screen to produce a single color image. Projection lenses are disposed at the front of the projection cathode ray tubes. On the inside surface of a panel glass of each CRT, a phosphor coating corresponding to each color is formed, and light is emitted in a predetermined pattern by irradiation of electron beams from an electron gun. The respective panel glasses emit the different colors of image light.

In such a projection TV system, since luminance is determined prior to the determination of the material of the phosphor, the distribution of the spectrum of the luminescence of the phosphor is generally broad and the color purity is insufficient. Further, since the spectrum of the luminescence is broad, chromatic aberration will occur due to the projection lens and thus image loss such as degradation of resolution, contrast, etc. will occur. In particular, there have been strong demands for improvement in the color purity in the CRT which produces green image light, which has a high luminosity factor.

Japanese Unexamined (Kokai) Patent Publication No. 3-61903 discloses a projection TV system in which the projection lenses have a light-absorbing substance added which absorbs light of the side bands of the luminescent characteristics of the cathode ray tubes. In the projection type TV system, it is possible to prevent image degradation to a certain extent. However, projection lenses especially for each color of R, G, and B are necessary and these have to be separately attached to the front of the cathode ray tubes. This makes the manufacturing process complicated and results in an increase in the manufacturing costs.

SUMMARY OF THE INVENTION

An object of the present invention is to provide a cathode ray tube apparatus for a projection TV system which exhibits improved color purity of the luminescence in the cathode ray tube apparatus.

Another object of the present invention is to provide a cathode ray tube apparatus for a projection TV system which reduces chromatic aberration by a projection lens.

Still another object of the present invention is to provide a cathode ray tube apparatus for a projection TV system which enables the same type of projection lens to be mounted on each of the cathodes and thus reduce manufacturing costs through the multiple use of the same component.

According to the present invention there is provided a cathode ray tube apparatus for a projection TV system used for projecting light of one of three primary colors on a display screen to display a color image on the display screen, and including panel glass and funnel glass, characterized in that a light-absorbing agent is incorporated into the panel glass so that the transmittance of the light of wavelengths other than the main wavelength of the spectrum of luminescence of the phosphor of the cathode ray tube in which the panel glass is used becomes lower than the transmittance of the light of the main wavelength.

The light of wavelengths other than the main wavelength is absorbed by the light-absorbing agent of the panel glass. That is, it becomes possible to have the light of the side bands in the spectrum of luminescence of the phosphor of the cathode ray tube absorbed at a greater rate and thus the color purity of the image light emitted from the cathode ray tube apparatus is improved. Further, while a projection lens is disposed in front of the cathode ray tube, the chromatic aberration caused by the color dispersion of the index of refraction of the lens material of the projection lens is improved.

Further, in the present invention, there is no need for coloring the projection lens, so the same type of projection lens may be used in common for each of the R, G, and B cathode ray tube apparatuses used in the projection TV and therefore the assembly and manufacturing costs can be reduced through the multiple use of the common component.

Specifically, the panel glass in the green CRT is formed so that the average value of the transmittance of the light of the wavelength in the range of 500 nm to 560 nm is set higher than the transmittance of the light of the wavelengths outside this range.

Also, specifically, the panel glass in the red CRT is formed so that the average value of the transmittance of the light of the wavelength in the range of 600 nm to 700 nm is set higher than the transmittance of the light of the wavelength in the range of 500 nm to 600 nm and wherein said cathode ray tube is used for projecting the red color image light.

Further, according to the present invention, there is provided a projection TV system, including: a first cathode ray tube apparatus for projecting the green color image light and including a first panel glass and a first funnel grass, the first panel glass being formed so that the average value of the transmittance of the light of the wavelength in the range of 500 nm to 560 nm is set higher than the transmittance of the light of the wavelengths outside this range; a second cathode ray tube apparatus for projecting the red color image light and including a second panel glass and a second funnel glass, the second panel glass being formed so that the average value of the transmittance of the light of the wavelength in the range of 600 nm to 700 nm is set higher than the transmittance of the light of the wavelength in the range of 500 nm to 600 nm; and a third cathode ray tube apparatus for projecting the blue color image light and including a third panel glass and a third funnel glass.

BRIEF DESCRIPTION OF THE DRAWINGS

The above and other features and objects of the present invention will become more clearly appreciated as a description of the preferred embodiments is made with reference to the accompanying drawings, in which.

DESCRIPTION OF THE PREFERRED EMBODIMENTS

Below, preferred embodiments of a cathode ray tube apparatus for a projection TV system according to the present invention will be explained in detail with reference to the drawings.

Figure 1A:
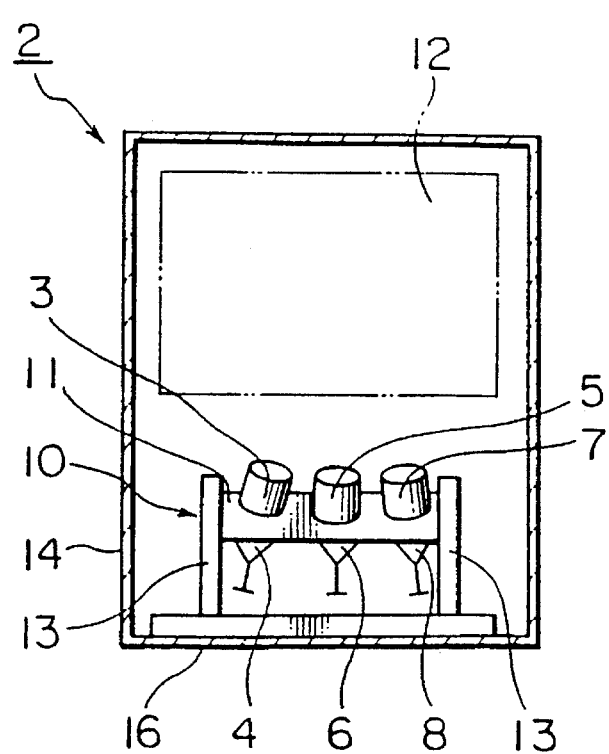
FIG. 1A and FIG. 1B are schematic sectional views of a projection TV system using cathode ray tube apparatuses of a first embodiment according to the present invention.
Figure 1B:
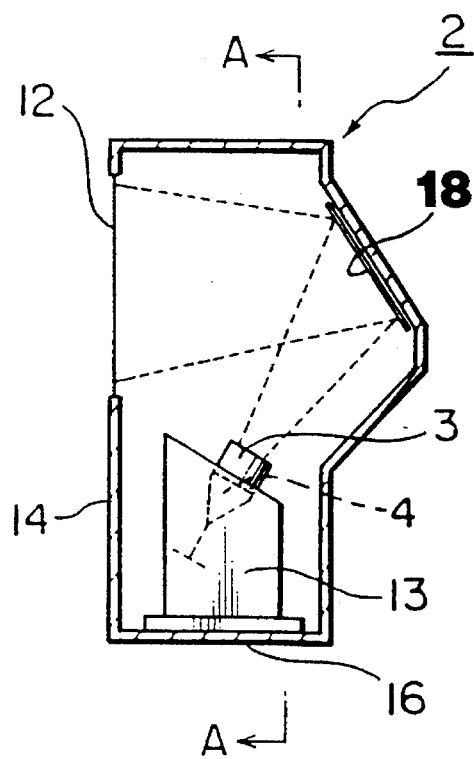

The projection TV system 2 shown in FIG. 1A and 1B is a rear type projection TV system. Three projection TV cathode ray tube apparatuses 4, 6, and 8 for emitting red (R), green (G), and blue (B) image light are attached to a chassis 10. Projection lenses 3, 5, and 7 are attached in front of the CRT apparatuses 4, 6, and 8. The chassis 10 has a first chassis member 11 to which the CRT apparatuses 4, 6, and 8 are directly attached and a pair of second chassis members 13 for supporting the two ends of the first chassis 11. The second chassis members 13 are attached on a support base 16 of a casing 14.

At the top front part of the casing 14 a large-sized display screen 12 is attached. Inside the casing 14, further, a reflection mirror 18 for reflecting back the images projected from the CRT apparatuses 4, 6, and 8 and forming an image at the reverse side of the display screen is attached.

The display screen 12 is comprised of a plurality of screen laminate plates each having at least a Fresnel screen and a lenticular screen.

Figure 2:
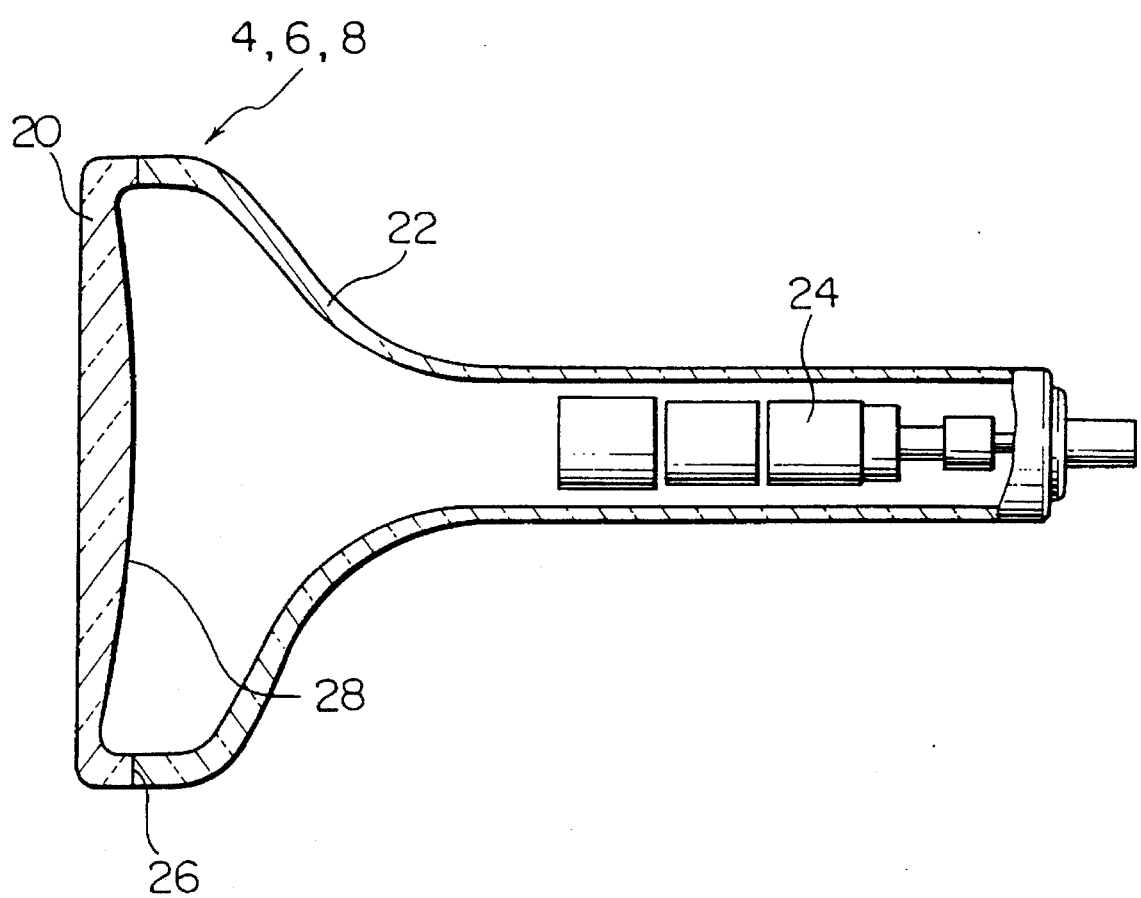
FIG. 2 is a schematic sectional view of a cathode ray tube apparatus according to the first embodiment.

The CRT apparatuses 4, 6, and 8 each have, as shown in FIG. 2, a panel glass 20 and funnel glass 22. The panel glass 20 and funnel glass 22 are fused together by frit glass 26. The inside of the CRT apparatus constituted by these glass pieces is held at a high degree of vacuum. An electron gun 24 is disposed inside the same. At the inside surface of the panel glass 20 is formed a phosphor coating 28.

The panel glass 20 is comprised of a glass with a high mass-absorption coefficient and with components of a nature which are not easily reduced electron beams, for example, $R_2O$—$BaO$—$SrO$—$ZrO_2$—$SiO_2$. Further, the funnel glass 22 is comprised of lead glass containing PbO for example.

The above phosphor constituting the phosphor coating 28 formed on the inner surface of the panel glass 20 may be $Y_2O_3$:Eu for R (red), $Gd_2O_2S$:Tb for G (green), and ZnS:Ag for B (blue).

In this embodiment, a light-absorbing agent (material) is incorporated into the panel glass 20 of each of the CRT apparatuses 4, 6, and 8 corresponding to R, G, and B so that the transmittance of the light of the wavelength other than the main wavelength of the spectrum of luminescence of the phosphor becomes lower than the transmittance of the light of the main wavelength. For example, the spectrum of luminescence of the phosphor used in the G (green) CRT apparatus has side band peaks proximate 580 nm on the yellow wavelength band and about 625 nm on the red wavelength band side in addition to the main peak of the green wavelength (main wavelength) band as shown by the solid line curve G in FIG. 3. Accordingly, in this embodiment, for example, as shown by the dotted curve A1 of FIG. 3, a light-absorbing agent is incorporated into the panel glass of the G color CRT apparatus so that the average value of the transmittance of the light of the wavelength in the range of 500 nm to 560 nm is higher than the transmittance of the light of the wavelength outside this range.

Figure 4:
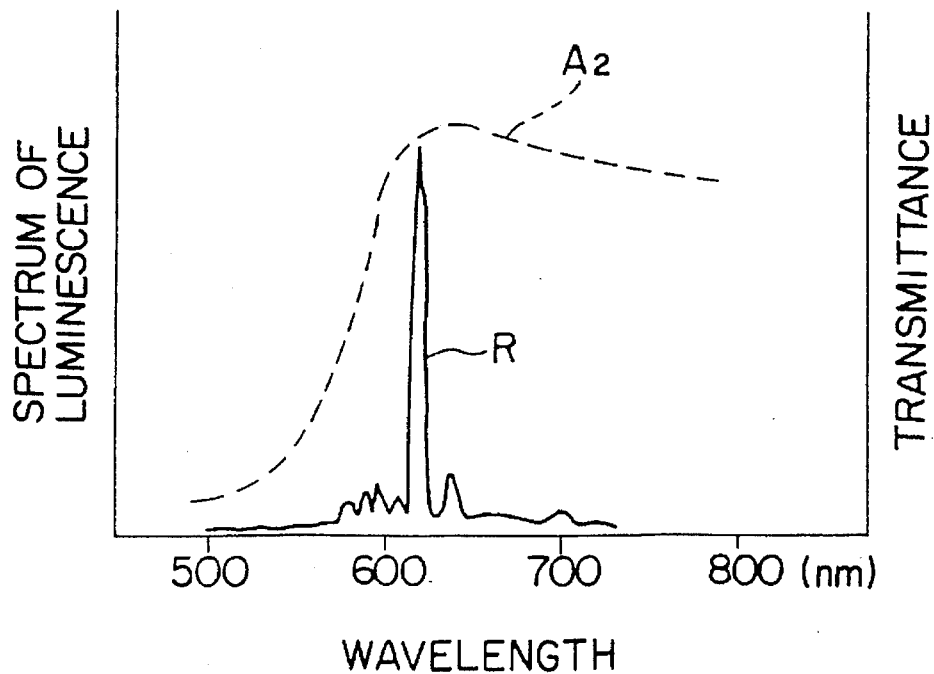
FIG. 4 is a graph showing the spectral distribution of the luminescence by a phosphor used for the R (red) cathode ray tube apparatus and the spectral transmittance characteristic of panel glass containing a light-absorbing agent.

Further, the spectrum of luminescence of the phosphor used for the R (red) color CRT apparatus, as shown by the solid line curve R of FIG. 4, has numerous side band peaks near the red wavelength band sides in addition to the main peak of the wavelength (main wavelength) band of red. In this embodiment, for example, as shown by the dotted curve A2 of FIG. 4, the light-absorbing agent is incorporated into the panel glass of the R color CRT apparatus so that the average value of the transmittance of the light of the wavelength in the range of 600 nm to 700 nm is higher than the transmittance of the light of the wavelength in the range of 500 nm to 600 nm.

Figure 3:
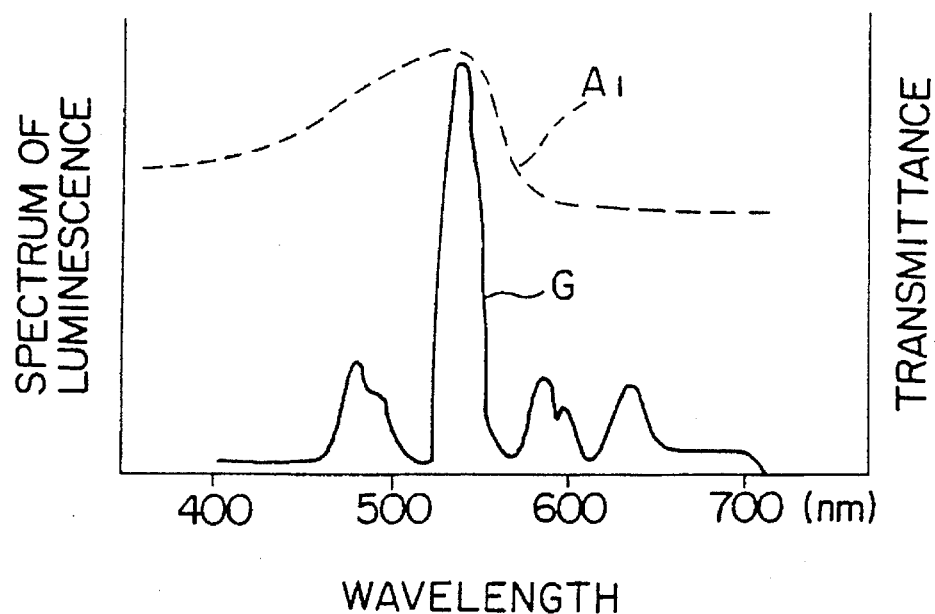
FIG. 3 is a graph showing the spectral distribution of the luminescence of a phosphor used for the G (green) cathode ray tube apparatus and the spectral transmittance characteristic of panel glass containing a light-absorbing agent.
Figure 5:
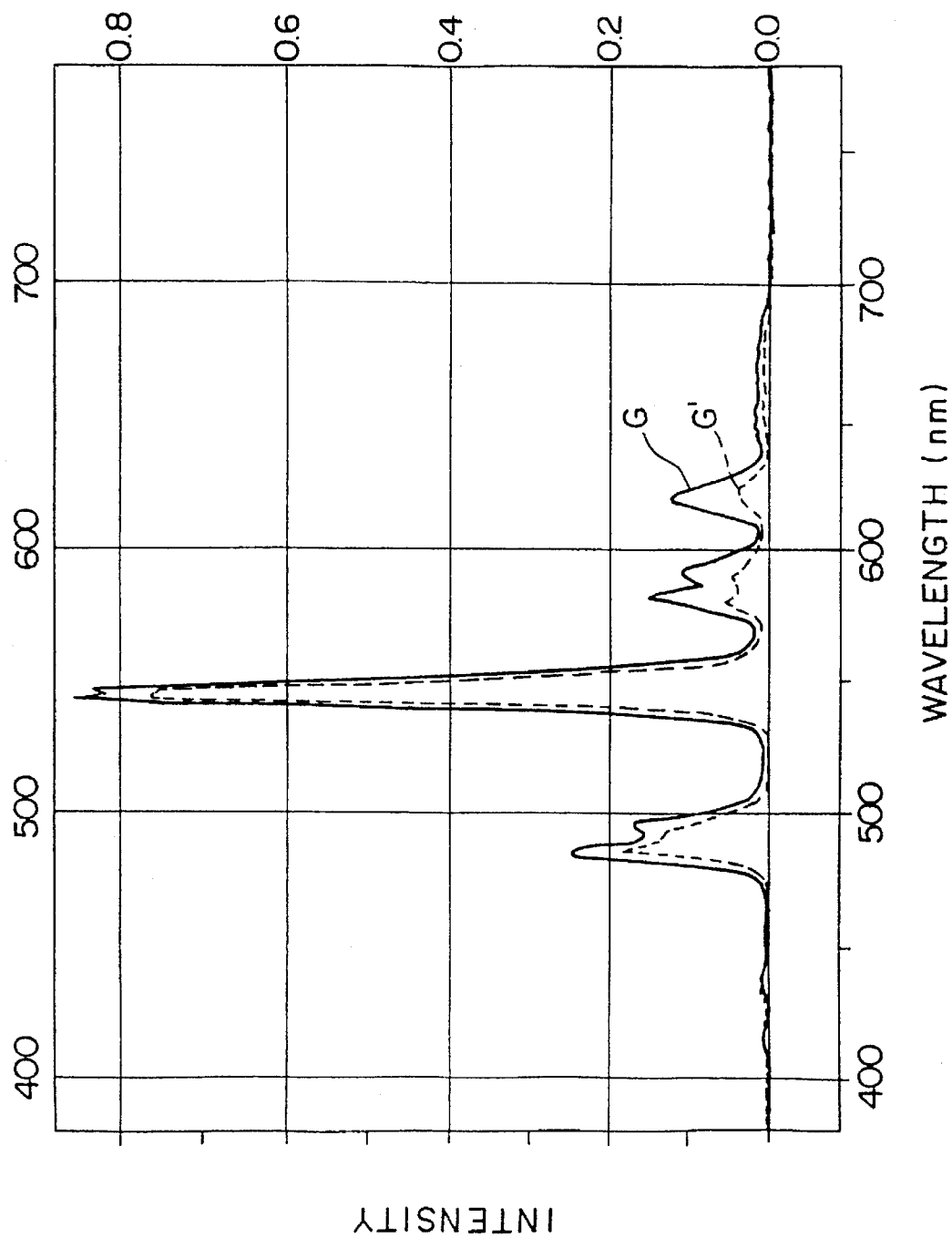
FIG. 5 is a graph showing a comparison of the spectral distributions of luminescence of G (green) cathode ray tube apparatuses using panel glass containing a light-absorbing agent and panel glass not containing the light-absorbing agent.

For example, if a light-absorbing agent is incorporated into the panel glass for the G color CRT apparatus so as to give a transmittance curve as shown in FIG. 3, then as shown in FIG. 5, the spectrum of luminescence from the CRT apparatus changes from the spectral distribution of the solid line curve G to the spectral distribution of the dotted line curve G', light is absorbed in a greater rate at the side bands areas with respect to the light having the main wavelength, and the color purity of green is improved.

A similar effect can be expected for a CRT apparatus for obtaining red or blue image light in addition to green, but by incorporating the above-mentioned light-absorbing agent into the panel glass of at least the CRT apparatus for obtaining the green image light, the color purity of the green, which has a particularly high luminosity factor, is improved and the image of the projection TV system can be improved.

Note that the light-absorbing agent which can be used in accordance with the present invention may be, for example, $FeO+Fe_2O_3$, $Cr_2O_3$, or $Pr_2O_3$ for G, $CdS \cdot CdSe$, $Sb_2S$, Cu, or Au for R, and CoO, CuO, FeO, $Ti_2O_3S$ for B.

To incorporate this light-absorbing agent into the panel glass, it is possible to use generally used methods of manufacture for making colored glass etc. The panel glass of the G color CRT can be coated with a film containing a phosphor the light emission characteristics of which are centered about Tb and which include $Y_3Al_1O_{12}$:Tb, $Gd_2O_2S$:Tb, or $InBo_3$:Tb.

The panel glass, as shown in FIG. 2, is bonded by frit glass 26 to the funnel glass 22 in a state with the electron gun 24 etc. attached inside. The inside is maintained at a high degree of vacuum.

Note that the present invention is not limited to the above-mentioned embodiments and can be modified in many ways.

For example, the present invention is not limited to a cathode ray tube apparatus for a rear type projection TV system and may be similarly adapted to a cathode ray apparatus for a front type projection TV system as well.

As explained above, according to the present invention, the color purity of the image light emitted from the CRT apparatus is improved. Further, while a projection lens is disposed in front of the cathode ray tube apparatus, the chromatic aberration caused by the color dispersion of the index of refraction of the lens material of the projection lens can be reduced.

Further, in the present invention, there is no need for coloring the projection lenses, so the same type of projection lens may be used for each of the R, G, and B cathode ray tube apparatuses and therefore the assembly and manufacturing costs can be reduced through the common use of the same parts.

What is claimed is:

1. A cathode ray tube apparatus for a projection TV system having a display screen, said cathode ray tube apparatus comprising:

a first cathode ray tube for projecting red light on the display;

a second cathode ray tube for projecting green light on the display screen; and a third cathode ray tube for projecting blue light on the display screen;

each of said first, second and third cathode ray tubes including a panel glass and a funnel glass;

a first light absorbing agent of $CdS \cdot CdSe$, $Sb_2S$, Cu or Au included in the panel glass of said first cathode ray tube;

a first phosphor film coating of $Y_2O_3$:Eu formed on an internal surface of the panel glass of said first cathode ray tube;

a second light absorbing agent of $FeO+Fe_2O_3$, or $Cr_2O_3$, included in the panel glass of said second cathode ray tube; and a second phosphor coating of $Y_3Al_1O_{12}$:Tb, $Gd_2O_2S$:Tb, or $InBo_3$:Tb formed on an internal surface of the panel glass of said second cathode ray tube;

said first and second light-absorbing agents being incorporated into the first and second panel glasses so that transmittance of wavelengths other than a respective main luminescence spectrum wavelength of the respective phosphor of said first and second cathode ray tubes, is lower than the transmittance of the respective main luminescence spectrum wavelengths.

2. A cathode ray tube apparatus for a projection TV system as set forth in claim 1, wherein the panel glass of said second cathode ray tube is formed so that the average value of the transmittance of the light of the wavelength in the range of 500 nm to 560 nm is set higher than the transmittance of the light of the wavelengths outside this range.

3. A cathode ray tube apparatus for a projection TV as set forth in claim 1, wherein panel glass of said first cathode ray tube is formed so that the average value of the transmittance of the light of the wavelength in the range of 600 nm to 700 nm is set higher than the transmittance of the light of the wavelength in the range of 500 nm to 600 nm.

4. A cathode ray tube apparatus for a projection TV system as set forth in claim 1, wherein the panel glass of said third cathode ray tube includes a light-absorbing agent of CuO, FeO, or $Ti_2O_3S$.

5. A cathode ray tube apparatus for a projection TV system as set forth in claim 4, wherein the panel glass of said third cathode ray tube has an internal surface coated with a phosphor film of ZnS:Ag.

6. A cathode ray tube apparatus for a projection TV system as set forth in claim 1, wherein each of the panel glasses of Said first, second and third cathode ray tubes is formed of a glass comprising $R_2O$—BaO—SrO—$ZrO_2$—$SiO_2$.

7. A projection TV system, comprising:

a first cathode ray tube apparatus for projecting green visible light and including a first panel glass and a first funnel glass, said first panel glass being formed so that the average transmittance value of light having a wavelength in the range of 500 nm to 560 nm is set higher than a transmittance of light having wavelengths outside this range, said first panel glass including a first light absorbing agent of $FeO+Fe_2O_3$, or $Cr_2O_3$, and having a first phosphor coating of $Y_3Al_1O_{12}$:Tb, $Gd_2O_2S$:Tb, or $InBo_3$:Tb formed on an internal surface thereof;

a second cathode ray tube apparatus for projecting red visible light and including a second panel glass and a second funnel glass, said second panel glass being formed so that the average transmittance value of light having a wavelength in the range of 600 nm to 700 nm is set higher than transmittance of light having a wavelength in the range of 500 nm to 600 nm, said second panel glass including a second light absorbing agent of $CdS \cdot CdSe$, $Sb_2S$, Cu or Au, and having a second phosphor film coating of $Y_2O_3$:Eu formed on an internal surface thereof; and a third cathode ray tube apparatus for projecting blue visible light and including a third panel glass and a third funnel glass, said third panel glass including a light-absorbing agent of CuO, FeO, or $Ti_2O_3S$ and is formed with a third phosphor film of ZnS:Ag on the interior surface thereof.

8. A projection TV system as set forth in claim 7, further comprising a reflection mirror and a display screen, said refection mirror being arranged to reflect the visible green, red, and blue light respectively projected from said first, second and third cathode ray tubes toward said display screen.

9. A cathode ray tube apparatus for a projection TV system having a display screen, said cathode ray tube apparatus comprising:

a first cathode ray tube for projecting red light on the display screen;

a second cathode ray tube for projecting green light on the display screen; and each of said first and second cathode ray tubes including a panel glass and a funnel glass;

a first light absorbing agent of $CdS \cdot CdSe$, $Sb_2S$, Cu or Au included in the panel glass of said first cathode ray tube;

a first phosphor film coating of $Y_2O_3$:Eu formed on an internal surface of the panel glass of said first cathode ray tube;

a second light absorbing agent of $FeO+Fe_2O_3$, or $Cr_2O_3$, included in the panel glass of said second cathode ray tube; and a second phosphor coating of $Y_3Al_1O_{12}$:Tb, $Gd_2O_2S$:Tb, or $InBo_3$:Tb formed on an internal surface of the panel glass of said second cathode ray tube;

said first and second light-absorbing agents being incorporated into the first and second panel glasses so that transmittance of wavelengths other than a respective main luminescence spectrum wavelength of the respective phosphor of said first and second cathode ray tubes, is lower than the transmittance of the respective main luminescence spectrum wavelengths.

10. A cathode ray tube apparatus for a projection TV system having a display screen and a reflection mirror, said cathode ray tube apparatus comprising:

a cathode ray tube for projecting red light on the reflection mirror, said cathode ray tube including a panel glass and a funnel glass;

a light absorbing agent of $CdS \cdot CdSe$, $Sb_2S$, Cu or Au included in the panel glass of said cathode ray tube; and a phosphor film coating of $Y_2O_3$:Eu formed on an internal surface of the panel glass of said cathode ray tube.

11. A cathode ray tube apparatus for a projection TV system having a display screen and a reflection mirror, said cathode ray tube apparatus comprising:

a cathode ray tube for projecting green light on the reflection mirror, said cathode ray tube including a panel glass and a funnel glass;

a light absorbing agent of $FeO+Fe_2O_3$, or $Cr_2O_3$, included in the panel glass of said cathode ray tube; and a phosphor coating of $Y_3Al_1O_{12}$:Tb, $Gd_2O_2S$:Tb, or $InBo_3$:Tb formed on an internal surface of the panel glass of said cathode ray tube.

* * * * *